United States Patent
Nassenstein et al.

[11] 3,788,728
[45] Jan. 29, 1974

[54] INCREASE IN THE TRANSMITTING INFORMATION CAPABILITIES OF WAVE IMAGE-FORMING SYSTEMS

[75] Inventors: Heinrich Nassenstein, Leverkusen-Steinbuchel; Hans-Georg Fitzky, Odenthal Hahnenberg, both of Germany

[73] Assignee: Bayer Akitengesellschaft, Leverkusen, Germany

[22] Filed: Oct. 13, 1971

[21] Appl. No.: 188,788

[30] Foreign Application Priority Data
Oct. 22, 1970 Germany..................2051851

[52] U.S. Cl........ 350/96 WG, 333/95 S, 350/162 R
[51] Int. Cl. .................................. G02b 5/14
[58] Field of Search... 350/96 WG, 162 R; 333/95 S

[56] References Cited
UNITED STATES PATENTS
3,650,594  3/1972  Nassenstein............... 350/162 SF X OTHER PUBLICATIONS
Dakss et al. "Grating Coupler For Efficient Excitation of Optical Guided Waves in Thin Films" Applied Physics Letters, Vol. 16, No. 12, pp. 523–525, 6/15/70, L7160 0018.

*Primary Examiner*—John K. Corbin
*Attorney, Agent, or Firm*—Burgess, Dinklage and Sprung

[57] ABSTRACT

A process of improving the information transmitting properties when mapping images by means of waves comprising the step of illuminating an object having a high spacial frequency spectrum $k_a$ with sub-waves having a wave number $k_s$, which has the same order of size as $k_a$, forming homogeneous waves of wave number $k_b = k_a - k_s$, by the diffraction of the sub-waves on the object. The sub-waves are produced by illuminating the entry of a periodically loaded wave guide with homogeneous waves, the vacuum wave length of which is large in comparison with the period of the wave guide load, so that the phase velocity of the homogeneous waves is retarded. The object is placed adjacent the periodic load.

4 Claims, 3 Drawing Figures

INCREASE IN THE TRANSMITTING INFORMATION CAPABILITIES OF WAVE IMAGE-FORMING SYSTEMS

The present invention relates to a process for increasing the transmitting information capabilities of wave image-forming systems according to U.S. Pat. application Ser. No. 14,477, filed Feb. 26, 1970, now U.S. Pat. No. 3,650,594, assigned to the assignee hereof, in which the spacial frequencies of the structure to be investigated are transformed by diffraction of sub-waves into a range of smaller spacial frequencies.

The subnormal wavelength and phase velocity of the sub-waves is essential for carrying into effect the process according to U.S. Pat. application Ser. No. 14,477, Sub-waves can be imposed on a medium by the marginal conditions. For example, sub-waves can be produced with the aid of total reflection at the boundary of two media having different refraction quotients.

Another method of producing sub-waves is to illuminate gratings having very small grating constants with homogeneous waves. It is a condition in such a case that the grating constant is small in relation to the wavelength of the radiation being used. Sub-waves are then formed which progress in the plane of the grating and are strongly attenuated in a direction perpendicular of said plane. The wavelength of these sub-waves is then the same as the grating constant of the irradiated grating.

It has now been found that sub-waves of high intensity can be produced if, in accordance with the invention, a periodic structure similar to a hollow conductor, i.e., periodically loaded wave guide is illuminated with homogeneous waves, the vacuum wavelength of which is large in relation to the period of this structure, so that a retardation in the phase velocity of the homogeneous waves is obtained. The polarisation plane of the incident homogeneous waves is preferably so chosen that it corresponds to the polarisation plane of the fundamental wave type of the hollow conductor structure.

The periodic hollow conductor structure for carrying out the process according to the invention is characterised by a channel of rectangular cross section which is engraved in a metal block and which is filled with vapour-deposited glass. The top of the channel is covered with a vapour-deposited gold layer, which is periodically interrupted in the direction of the hollow conductor axis by a plurality of slits perpendicular to the axis.

In order that the homogeneous waves enter the hollow conductor structure free from reflection, a horn antenna and slits of graduated length are arranged at the entrance of the hollow conductor.

As already explained, the essence of this technique consists in that the periodic marginal conditions cause a retardation in the phase velocity of the electromagnetic wave. By way of example, it is possible in this way to produce in the microwave range phase velocities which are reduced in relation to the phase velocities of the homogeneous waves by a factor of from 100 to 1000. As regards the periodic hollow conductor structures which are described herein, these are therefore in principle optical delay lines.

One embodiment of the hollow conductor structure according to the invention is shown by way of example in the drawings and is hereinafter more fully described.

The periodic hollow conductor structure consists of a rectangular tube 1 with the dimensions $a = 0.22$ $\mu m$ and $b = 1.0$ $\mu m$. On broad side of the rectangular tube is provided at constant intervals with altogether about 90 slits 2. The length of the slits is here $2\ 1 = 0.6$ $\mu m$, their width s is about 0.05 $\mu m$ and the mutual spacing $p$ of the slits is 0.075 $\mu m$. A delay line with these dimensions is suitable for being fed with homogeneous waves of the wavelength $\lambda = 1.3$ $\mu m$ to 1.9 $\mu m$. The resonance frequency of the slits is $f_3 = c/4\ 1$, in which $c$ is the velocity of light. The resonance frequency determines the upper limiting frequency of the delay line. The lower limiting frequency $f_1$ is given by the width b of the rectangular tube. With energisation of the $TE_{01}$ field type, the lower limiting frequency is $f_1 = 2b \cdot n$, in which $n$ indicates the refractive index of the dielectric in the rectangular tube. The spacing $p$ of the slits determines the phase velocity and thus the wavelength obtainable for the sub-waves. The phase velocity amounts to $v_{ph} = 2\pi p\, f/\Omega$, in which $f$ represents the frequency of the homogeneous waves and $\Omega$ the phase rotation between two consecutive slits. With energisation by a forwardly travelling wave, $\Omega$ lies between 0 or $\pi$. For homogeneous waves with a wavelength of $\lambda = 1.5$ $\mu m$ ($f = 2 \cdot 10^{14}$ c/s), the phase velocity is then $c/10$; a retardation of the phase velocity by the factor 10 is then obtained.

Figure 1:
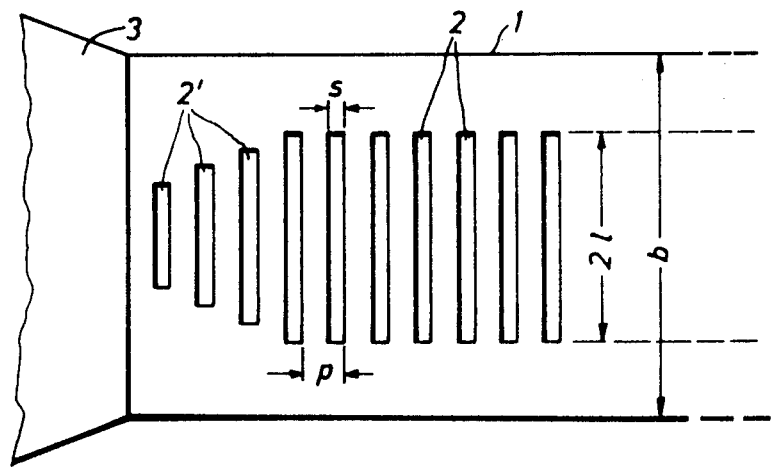
FIG. 1 shows a top plan view of the periodic hollow conductor structure.
Figure 2:
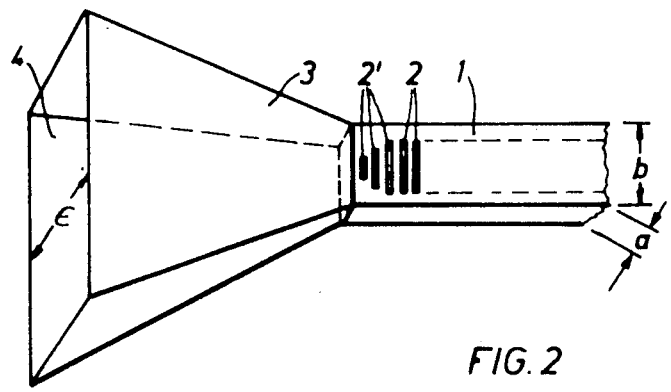
FIG. 2 is a perspective view of the periodic hollow conductor structure with a horn antenna at the entry to the hollow conductor.

The feeding of the delay line is effected by a linearly polarised transverse wave, of which the $\beta$-vector lies perpendicular to the broad side b of the tubular conductor (FIGS. 2 and 3), so that the $TE_{01}$ wave is energised in the tubular conductor.

The slits 2' at the inlet end of the hollow conductor are graduated in their lengths. In addition, a horn antenna 3 is arranged at the entry. It is made possible in this way for the radiation to be fed into the hollow conductor structure substantially free from reflection.

Figure 3:
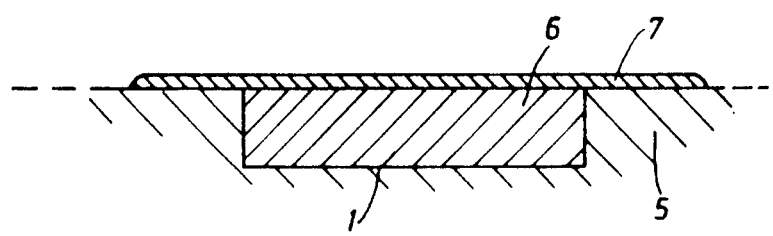
FIG. 3 is a cross-section through the periodic hollow conductor structure.

The hollow conductor structure is provided in known manner by means of controlled electron beams. This technique is for example fully described in G. Mollenstedt, R. Schief, R. Speidel, Optik 27 (1968) Page 488. A hollow conductor structure produced in this way is shown in FIG. 3. The tubular conductor 1 is engraved by the controlled electron beam in a metal block 5. The channel 1 as thus formed is then filled with vapour deposited glass. Such a glass is obtainable commercially, for example, under the name of Schott Aufdampfglas 8329. In this way, the lower limiting frequency $f_1$ of the hollow conductor structure can be lowered by the factor n (dielectric constant of the vapourised glass). Thereafter, the filled channel has a gold layer 7 vapour-coated thereon. The slits 2 and 2' are then produced in the gold layer 7, likewise by means of controlled electron beams.

We claim:

1. A process of improving the information transmitting properties when mapping images by means of waves, comprising the step of illuminating an object having a high spacial frequency spectrum $k_1$ with sub-waves having a wave number $k_s$ which has the same order of size as $k_a$, forming homogeneous waves of wave number $k_b = k_a - k_s$ by the diffraction of the sub-waves on the object, wherein the sub-waves are produced by illuminating the entry of a periodically loaded wave guide with homogeneous waves, the vacuum wave length of which is large in comparison with the period of the wave guide load, so that the phase velocity of the homogeneous waves is retarded, the object being placed adjacent the periodic load.

2. A process according to claim 1, characterised in that the polarisation plane of the incident, homogeneous waves is so chosen that it conforms to the polarisation plane of the fundamental wave in the periodically loaded wave guide.

3. A periodic hollow conductor structure suitable for carrying out the process according to claim 1, characterised by a channel of rectangular cross-section which is engraved in a metal block and filled with vapour-deposited glass the glass surface being covered with a vapour-deposited gold layer which is provided with a plurality of slits periodically arranged along the length of the channel.

4. A structure according to claim 3, wherein a horn antenna and slits of graduated lengths are arranged at the entry to the hollow conductor to provide for reflection-free entry of the homogeneous waves into the conductor.

* * * * *

UNITED STATES PATENT OFFICE
CERTIFICATE OF CORRECTION

Patent No. 3,788,728          Dated January 29, 1974

Inventor(s) Heinrich Nassenstein and Hans-Georg Fitsky

It is certified that error appears in the above-identified patent and that said Letters Patent are hereby corrected as shown below:

1. Col. 2, line 35, change "ß" to the lower case Greek letter epsilon, i.e. --$\epsilon$--.

2. Col. 2, line 65, (claim 1, line 4), change "$k_1$" to --$k_a$--.

Signed and sealed this 11th day of February 1975.

(SEAL)
Attest:

RUTH C. MASON
Attesting Officer

C. MARSHALL DANN
Commissioner of Patents
and Trademarks